(12) United States Patent
Levy et al.

(10) Patent No.: US 8,870,104 B2
(45) Date of Patent: Oct. 28, 2014

(54) METHOD FOR SEPARATING CARPET FIBERS

(76) Inventors: Frank Levy, Quogue, NY (US); Sergio Dell'Orco, Capalle (IT)

( * ) Notice: Subject to any disclaimer, the term of this patent is extended or adjusted under 35 U.S.C. 154(b) by 496 days.

(21) Appl. No.: 12/930,696

(22) Filed: Jan. 13, 2011

(65) Prior Publication Data
US 2012/0181361 A1 Jul. 19, 2012

(51) Int. Cl.
*B02C 17/02* (2006.01)

(52) U.S. Cl.
USPC .................... 241/24.19; 241/24.29; 241/30

(58) Field of Classification Search
USPC ............ 241/24.1, 24.12, 24.15, 24.18, 24.19, 241/24.21, 24.28, 24.29, 30, 301; 209/309–359
See application file for complete search history.

(56) References Cited

U.S. PATENT DOCUMENTS

| | | | | |
|---|---|---|---|---|
| 3,133,319 | A | * | 5/1964 | Gould et al. ................. 19/205 |
| 3,579,744 | A | | 5/1971 | Menzies, Jr. |
| 3,797,073 | A | | 3/1974 | Fairfield |
| 4,028,159 | A | | 6/1977 | Norris |
| 4,319,990 | A | * | 3/1982 | Muller ..................... 209/240 |
| 4,404,710 | A | | 9/1983 | Wood |
| 4,520,530 | A | | 6/1985 | Pinto |
| 4,586,218 | A | | 5/1986 | Pinto |
| 4,599,766 | A | | 7/1986 | Wirth |
| 4,615,080 | A | | 10/1986 | Wirth |
| 4,657,444 | A | | 4/1987 | Pinto |
| 4,661,025 | A | | 4/1987 | Pinto et al. |
| 4,682,388 | A | | 7/1987 | Pinto |
| 4,694,538 | A | | 9/1987 | Pinto et al. |
| 4,734,957 | A | | 4/1988 | Lenzen |
| 4,769,873 | A | | 9/1988 | Pinto |
| 4,864,693 | A | | 9/1989 | Pinto et al. |
| 4,968,188 | A | | 11/1990 | Lucassen |

(Continued)

FOREIGN PATENT DOCUMENTS

| | | |
|---|---|---|
| WO | WO 0131096 A1 | 5/2001 |
| WO | WO 03060165 A1 | 7/2003 |
| WO | WO 2004003237 A1 | 1/2004 |

OTHER PUBLICATIONS

Appendix A, Descriptions of the 25 Case Studies, pp. A-1-A-118 from Lempert, R. J. et al., Next Generation Environmental Technologies: Benefits and Barriers, Santa Monica, Calif. RAND Corporation, MR-1682-OSTP, 2003. As of Dec. 7, 2010: http://www.rand.org/pubs/monograph_reports/MR1682.

(Continued)

*Primary Examiner* — Shelley Self
*Assistant Examiner* — Leonel Vasquez
(74) *Attorney, Agent, or Firm* — Thomas A. O'Rourke; Bodner & O'Rourke, LLP

(57) ABSTRACT

A system for separating carpet U's from carpet backing is described. The separation method includes a means for transporting a blend of carpet U's and backing material containing at least backing fibers and an adhesive material to a shaker box. The shaker box has at least one opening for receiving the blend. One or more portions of the shaker box have one or more orifices. The shaker box causes the carpet U's to pass through the orifices when the shaker box is activated leaving at least the backing fibers in the shaker box. The U's are passed to a cleaning means where said U's are treated to remove portions of adhesive material present on said U's. The backing fibers are released from said shaker box and transported for further treatment.

26 Claims, 6 Drawing Sheets

(56) References Cited

U.S. PATENT DOCUMENTS

| | | | |
|---|---|---|---|
| 5,016,324 A | 5/1991 | Konig | |
| 5,022,122 A | 6/1991 | Clement | |
| 5,169,870 A | 12/1992 | Corbin | |
| 5,230,473 A | 7/1993 | Hagguist | |
| 5,457,197 A | 10/1995 | Sifniades | |
| 5,491,186 A | 2/1996 | Kean et al. | |
| 5,497,949 A | 3/1996 | Sharer | |
| 5,515,577 A | 5/1996 | Pinto et al. | |
| 5,518,188 A | 5/1996 | Sharer | |
| 5,535,945 A * | 7/1996 | Sferrazza et al. | 241/24.12 |
| 5,586,365 A | 12/1996 | Leifeld et al. | |
| 5,623,749 A | 4/1997 | Leifeld et al. | |
| 5,656,757 A | 8/1997 | Jenczewski | |
| 5,681,952 A | 10/1997 | Sifniades | |
| 5,701,939 A | 12/1997 | Pinto et al. | |
| 5,704,104 A | 1/1998 | Bacon et al. | |
| 5,722,603 A | 3/1998 | Costello et al. | |
| 5,728,741 A * | 3/1998 | Zegler et al. | 521/40 |
| 5,859,071 A * | 1/1999 | Young et al. | 521/40.5 |
| 5,908,164 A * | 6/1999 | Robinson et al. | 241/19 |
| 5,926,918 A | 7/1999 | Snell et al. | |
| 5,950,282 A | 9/1999 | Pinto | |
| 5,952,660 A | 9/1999 | Kip et al. | |
| 6,029,916 A | 2/2000 | White | |
| 6,059,207 A | 5/2000 | Costello et al. | |
| 6,061,876 A | 5/2000 | Rowe | |
| 6,126,096 A | 10/2000 | Robinson | |
| 6,138,326 A | 10/2000 | Pinto | |
| 6,159,882 A | 12/2000 | Kean et al. | |
| 6,250,575 B1 * | 6/2001 | White | 241/76 |
| 6,263,545 B1 | 7/2001 | Pinto | |
| 6,276,028 B1 | 8/2001 | Pinto | |
| 6,296,795 B1 | 10/2001 | Buck | |
| 6,305,920 B1 | 10/2001 | Kean et al. | |
| 6,378,179 B1 | 4/2002 | Hirsch | |
| 6,379,489 B1 | 4/2002 | Goulet et al. | |
| 6,398,138 B1 | 6/2002 | Robinson | |
| 6,589,294 B2 | 7/2003 | Hortel et al. | |
| 6,598,814 B2 | 7/2003 | Bascom et al. | |
| 6,752,336 B1 | 6/2004 | Wingard | |
| 6,814,826 B1 | 11/2004 | Bell | |
| 7,094,309 B2 | 8/2006 | Schneider | |
| 7,115,671 B2 * | 10/2006 | Courage et al. | 521/49.8 |
| 7,152,742 B2 * | 12/2006 | Donaj et al. | 209/176 |
| 7,635,099 B1 * | 12/2009 | Meredith et al. | 241/21 |
| 7,784,719 B1 * | 8/2010 | Wingard | 241/20 |
| 8,110,131 B1 * | 2/2012 | Dell'Orco et al. | 264/141 |
| 8,205,814 B2 * | 6/2012 | Lindsey et al. | 241/29 |
| 2003/0075824 A1 | 4/2003 | Moore, Jr. et al. | |
| 2003/0111606 A1 | 6/2003 | Berghmans et al. | |
| 2004/0088829 A1 | 5/2004 | Atkinson | |
| 2008/0128933 A1 | 6/2008 | Przybylinski et al. | |
| 2011/0040027 A1 * | 2/2011 | Keating | 524/567 |
| 2012/0161368 A1 * | 6/2012 | Levy et al. | 264/442 |
| 2012/0241542 A1 * | 9/2012 | Lindsey et al. | 241/19 |
| 2012/0325943 A1 * | 12/2012 | Levy et al. | 241/24.1 |
| 2012/0325947 A1 * | 12/2012 | Levy et al. | 241/81 |
| 2013/0068865 A1 * | 3/2013 | Levy et al. | 241/19 |
| 2013/0112790 A1 * | 5/2013 | Rees et al. | 241/24.1 |
| 2013/0175377 A1 * | 7/2013 | Levy et al. | 241/60 |

OTHER PUBLICATIONS

Background Document for the Final Comprehensive Procurement Guideline (CPG) III and Final Recovered Materials Advisory Notice (RMAS) III, copyright 1999, U.S. Environmental Protection Agency, Office of Solid Waste, EPA-530-R-00-002.

Bally Ribbon Mills, Glossary of Common Textile Terms, "Selvage" definition, copyright Dec. 2010.

Carpet America Recovery Effort (CARE) Annual Report 2003, copyright Apr. 2004, pp. 1-28. As of Dec. 7, 2010: http://www.carpetrecovery.org/pdf/annual_report/03_CARE-annual-rpt.pdf.

Carpet America Recovery Effort (CARE) Annual Report 2004, copyright May 2005. As of Dec. 7, 2010: http://www.carpetrecovery.org/pdf/annual_report/04_CARE-annual-rpt.pdf.

Carpet America Recovery Effort (CARE) Annual Report 2005, copyright May 2006, pp. 1-44. As of Dec. 7, 2010: http://www.carpetrecovery.org/pdf/annual_report/05_CARE-annual-rpt.pdf.

Carpet America Recovery Effort Annual Report, copyright 2002, pp. 1-29. As of Dec. 7 2010: http://www.carpetrecovery.org/pdf/annual_report/02_CARE-annual-rpt.pdf.

Carpet Recycling Facts and Figures, copyright Jun. 2004, PowerPoint slide show, Fifth Annual World Conference, Duesseldorf, Germany.

Celanese Acetate, Complete Textile Glossary, "SELVAGE or SELVEDGE" definiton, copyright 2001, Celanese Acetate, LLC.

Current Status of Product Stewardship for Carpet, copyright Feb. 2000, Midwestern Workgroup on Carpet Recycling. As of Dec. 7, 2010: http://www.greenbiz.com/sites/default/files/document/O16F29644.pdf.

DellOrco andVillani Designs New Fiber-Opening Concept, copyright Feb. 2001, Textile World web page. As of Dec. 7, 2010: http://www.textileworld.com/Articles/2001/February/New_Products/DellOrcoandVillani_Designs_New_Fiber-Opening_Concept.html.

Eighth Annual Conference on Recycling of Fibrous Textile and Carpet Waste, copyright May 2003, Conference Program, North West Georgia Trade & Convention Center, Dalton, GA, USA. As of Dec. 7, 2010: http://www.tfe.gatech.edu/recycle_conf/8th_5-03.pdf.

Fifth Annual Conference on Recycling of Fibrous Textile and Carpet Waste, copyright May 2000, Program, North West Georgia Trade & Convention Center, Dalton, GA, USA as of Dec. 7, 2010: http://www.tfe.gatech.edu/recycle_conf/5th_5-00.pdf.

Fourth Annual Conference on Recycling of Fibrous Textile and Carpet Waste, copyright May 1999, Northwest Georgia Trade & Convention Center, Dalton, GA, USA. As of Dec. 7, 2010: http://www.tfe.gatech.edu/recycle_conf/4th_5-99.pdf.

Levy, F. J., et al., New Technology for Opening Textile Waste, Fifth Annual Conference on Recycling of Fibrous Textile and Carpet Waste, copyright May 2000, PowerPoint slide show, North West Georgia Trade & Convention Center, Dalton, GA, USA. As of Dec. 7, 2010: http://smartech.gatech.edu/bitstream/handle/1853/10776/5th_15_levy.pdf, jsessionid=E0727497D40E8AABEC0305871EB914B6.smart1?sequence=1.

Muzzy, J., Recycling Post-Consumer Carpet, copyright 2005, Global Plastics Environmental Conference (GPEC 2005): Creating Sustainability for the Environment, Proceedings of a Society of Plastics Engineers ( SPE ) meeting held Feb. 23-25, 2005, Atlanta, Georgia, USA. As of Dec. 7, 2010: http://www.sperecycling.org/GPEC/GPEC2005/papers/Paper_04.pdf.

Ninth Annual Conference on Recycling of Fibrous Textile and Carpet Waste, copyright May 2004, Program, North West Georgia Trade & Convention Center, Dalton, GA, USA. As of Dec. 7, 2010: http://www.tfe.gatech.edu/recycle_conf/9th_5-04.pdf.

NTC Project SO3-PH01, Sustainability as a Source of Competitive Advantage, copyright Nov. 2005, National Textile Center Annual Report, pp. 1-10.

Recycling Interior Finish Materials—Carpet and Ceiling Tiles, copyright Mar. 2003, Public Works Technical Bulletin 200-1-17. As of Dec. 7, 2010: http://www.wbdg.org/ccb/ARMYCOE/PWTB/pwtb_200_1_17.pdf.

Recycling of Fibrous Textile and Carpet Waste, Final Program, copyright Jun. 1996, School of Textile & Fiber Engineering, Georgia Institute of Technology and Consortium on Competitiveness for the Apparel, Carpet and Textile Industries (CCATCI), Red Top Mountain Lodge, Cartersville, GA, USA. As of Dec. 7, 2010: http://www.tfe.gatech.edu/recycle_conf/1st_6-96.pdf.

Resource Conservation Challenge Strategic Plan, What Can You Save Tomorrow?, Five Year Plan, copyright Jun. 2005, pp. 1-20, United States Environmental Protection Agency. As of Dec. 7, 2010: http://www.epa.gov/osw/rcc/resources/strat-plan.pdf.

Second Annual Conference on Recycling of Fibrous Textile and Carpet Waste, copyright May 1997, The School of Textile & Fiber Engineering, Georgia Institute of Technology, Renaissance Atlanta Hotel Downtown, Atlanta, GA, USA. As of Dec. 7, 2010: http://www.tfe.gatech.edu/recycle_conf/2nd_5-97.pdf.

(56) References Cited

OTHER PUBLICATIONS

Seventh Annual Conference on Recycling of Fibrous Textile and Carpet Waste, copyright May 2002, Conference Program, North West Georgia Trade & Convention Center, Dalton, GA, USA. As of Dec. 7, 2010: http://www.tfe.gatech.edu/recycle_conf/7th_5-02.pdf.

Sham-Judd, M., Carpet Waste and Carpet Fiber Recycling: A Study of Open and Closed Loop Recycling Processes, date unknown, pp. 47-70. As of Dec. 7, 2010: http://www.p2pays.org/ref/09/08622.pdf.

Sixth Annual Conference on Recycling of Polymer, Textile, and Carpet Waste, copyright Apr. 2001, Conference Program, North West Georgia Trade & Convention Center, Dalton, GA, USA. As of Dec. 7, 2010: http://www.tfe.gatech.edu/recycle_conf/6th_4-01.pdf.

Source Report: ReEntry®, copyright Jul. 2006, Bentley Prince Street, 05SRC1114SS, pp. 1-2. As of Dec. 7, 2010: http://www.bentleyprincestreet.com/Documentation/bp-ReEntrySourceReport_05SRC1114SS.pdf.

The Carpet Industry's Sustainability Report, copyright 2003, The Carpet and Rug Institute, pp. 1-27. As of Dec. 7, 2010: http://www.carpet-rug.org/pdf_word_docs/03_CRI-Sustainability-Report.pdf.

Third Annual Conference on Recycling of Fibrous Textile and Carpet Waste, copyright Apr. 1998, Program. As of Dec. 7, 2010: http://www.tfe.gatech.edu/recycle_conf/3rd_4-98.pdf.

Wang, Y. et al., Recycling of Carpet and Textle Fibers, copyright 2003, pp. 697-725, Plastics and the Environment: A Handbook, Chapter 16, John Wiley & Sons, New York, USA. As of Dec. 7, 2010: http://www.prism.gatech.edu/~yw6/Fiberrecycling/Fiber%20Recycling%20Chapter%2016.pdf.

Wang, Y., Carpet Recycling Technologies, copyright Mar. 2006, pp. 1-11, School of Polymer, Textile and Fiber Engineering, Georgia Institute of Technology, Atlanta, GA, USA as of Dec. 7, 2010: http://www.prism.gatech.edu/~yw6/Fiberrecycling/Recycling%20in%20Textiles%20YWang%20Ch6.pdf.

Wulfhorst, B. et al., Textile Technology, copyright Apr. 2006, pp. 74-84, Principles and Machinery for Yarn Production, ISBN 3-446-22963-9. As of Dec. 7, 2010: http://bilder.buecher.de/zusatz/14/14694/14694935_lese_1.pdf.

Anonymous (1996). Separation Process. Kenneth Mason Publications Ltd. Research Disclosure Journal, 38813. Retrieved from http://www.researchdisdosure.com.

\* cited by examiner

METHOD FOR SEPARATING CARPET FIBERS

FIELD OF THE INVENTION

The present invention relates to improvements in carpet recycling and more particularly post consumer carpet recycling wherein the post consumer carpet is more readily separated into its individual component polymeric materials.

BACKGROUND OF THE INVENTION

Recycling is a popular activity. Many people are trying to conserve natural resources and reusing components of products can help that conservation effort. That is one reason why many states have required deposits when purchasers buy beverages in aluminum cans and plastic bottles. The production of aluminum from bauxite is a very energy intensive process and recycling of aluminum cans becomes cost effective. Recycling of PET soda bottles is another area where recycling has been successfully applied.

Recycling PET bottles into carpet fibers are one area where recycling has achieved certain benefits. Besides reducing raw materials costs it has also reduced materials going into landfills. It is not uncommon for carpet manufacturers to use recycled two liter soda bottles in the production of polyester based carpet. PET polyester carpet is manufactured with yarn created from reclaimed polyester resins.

Post consumer carpet has not been an area where recycling has become wide spread. Post consumer carpet refers to carpet that has been installed in a house or office and is in need of removal so it can be replaced with new carpet or other types of flooring. Once the carpet installed in a house or office wears out, until recently the only destination for disposal of these carpets has been a landfill. Because of the type of ingredients used in carpet, i.e. thermoplastic polymeric materials, degradation in a landfill can take innumerable years. In addition, as landfill space has become scarcer and as petroleum based products have become more expensive due to the increase in petroleum costs and/or dwindling oil supplies, there has been an increasing interest in finding an industrial economical way to recycle post consumer carpets.

Carpets like many other composite materials are difficult to recycle effectively because they comprise a number of different materials that have been combined in a final article and it is difficult to separate out the composite into its individual components. This is important because the individual components have more value than as a composite. Carpets are comprised of a backing which supports and hold together a plurality of fibers that extend from the backing which form the pile or surface that is walked on by the user. An adhesive based material is typically used to secure the backing and the fibers together. Usually one type of polymeric material is used for the face fibers of the carpet and the backing uses another different polymeric material. In many carpets, this face fiber that makes up the pile may be a nylon, polyolefin a polyester etc. The backing is usually a polypropylene material although other materials may be used. In addition, the adhesive or other means to secure the fibers to the backing can be a third frequently different material. Because of the multiplicity of materials, carpet has been difficult to recycle into reusable individual components because the materials that comprise the carpet can not be readily or easily separated into the individual polymers. While there are some uses for composite polymeric materials, the value of the recycled post consumer carpet increases significantly if the components can be separated.

Some companies have resorted to burning the carpet as a source of heat instead of dumping it in a landfill because of the difficulties in separating the carpet components. In the burning method of recycling, typically the carpet is burned as a fuel and the heat is used to generate steam which can be used to generate electricity. The heat generated by the burning carpet can be used for other purposes as well. While this reduces landfill dumping, it is not really a satisfactory means of recycling the carpet materials. Another approach towards recycling can include melting the carpet instead of burning it and attempting to separate the components in the blend based on their melting or vaporization points. This type of process is energy intensive and requires complex equipment. This equipment must prevent the fibers from burning while they are heated to the proper melting temperatures to separate the components. Separating the melted carpet materials is not easily performed. Because of the difficulty in separating the components of a carpet into substantially uniform end products of primarily a single component, the recycled material is usually not used for new carpet but is rather used in such non-carpet products as park benches and other items where a blend of different polymers is not objectionable.

OBJECTS OF THE INVENTION

It is an object of the invention to provide a system for recycling portions of carpets.

It is an object of the invention to provide an apparatus for recycling post consumer carpet as well as post industrial carpet.

It is also an object of the invention to provide a system for mechanically separating carpet components for recycling.

It is a further object of the invention to separate unsheared U's (Long U's) of carpet fibers from the carpet backing.

It is a still further object of the invention to separate sheared U's (Short U's) of carpet fibers from the carpet backing.

It is another object of the invention to separate the fiber portions of the carpet U's from the backing material.

It is a further object of the invention to separate the adhesive from the backing material.

It's a still further object of the invention to separate the fiber U's from the adhesive material.

It is also another object of the invention to separate the materials that make up the U's of a carpet from the material that makes up the backing material as well as from the adhesive material used in the backing.

SUMMARY OF THE INVENTION

The present invention provides a system and method for recycling components of a carpet, more specifically the present invention is particularly suitable for recycling the portion of the carpet called the U's. The U's are the face fiber that is tufted into the backing. The "short Us" are the portion of the carpet that are left attached to the backing when a portion of the pile or face fibers of the carpet have been removed by, for example, shearing. However, the present invention can be used to recycle carpets that have not been previously sheared, this portion of face fibers is called "long U's". The carpet may be in the form of squares or sheets of carpet that have been cut up from a larger section of carpet. The backing is usually made up of fibers that are different from the fibers that are the face fibers. The U's are typically secured to the backing by an adhesive.

The sheet of carpet that is to be recycled may initially be cut into smaller pieces for processing, if desired. The carpet may be sheared to remove a portion of the face fibers or it may be unsheared. Either way, the carpet can be treated as described in our co-pending U.S. patent application Ser. No. 12/806,454, filed Aug. 12, 2010. This system takes a piece of carpet and removes the pile or face fibers and generally breaks up the backing section of carpet into a plurality of U's with some backing material and adhesive present.

After the backing of a carpet with U's attached is broken up, as described in application Ser. No. 12/806,454 or by other means desired, the materials are initially transported to a condenser. The condenser is preferably a cylinder rotating horizontally and divided internally into two areas by a horizontal steel plate. The top section has a negative pressure within the cylinder. The negative pressure causes the dust and debris from the tearing process to be drawn by the negative pressure through one or more openings in the condenser drum. The remaining portion of the U's are usually adhered by the negative pressure onto the surface of the cylinder in the condenser. As the drum rotates, the remaining portion of the fibers are separated from the outer surface of the cylinder in the condenser by a suitable means. In one embodiment, a conveyor belt, which is oriented in the vertical direction, touches the perforated drum of the condenser while rotating at about the same peripheral speed as the drum in order to seal and keep separated the area of the condenser under negative pressure (i.e. the top part) and the one at atmospheric pressure (i.e. the bottom part) so that the air used for transporting the fibers is removed from the top part and delivered to filters. As the fibers pass below the horizontal steel partition plate, they can enter into the atmospheric pressure area and fall into the buffer box.

The buffer box is a receptacle that receives the fibers from the condenser. The buffer box can include a horizontal conveyor that moves the fibers towards a second inclined conveyor belt equipped with a plurality of pins or a plurality of paddles or receptacles which raise the separated fibers from the first conveyor up to the top region of the buffer box. At the end of the second conveyor, there is a pair of drive rollers, one being on the side of the inclined conveyor closest to the first conveyor, and one drive roller being on the side of the inclined conveyor opposite to the first conveyor. In a preferred embodiment, the drive rollers are provided with a plurality of paddles. Alternatively, the rollers may be provided with pins or with brushes extending from the outer surface of the drive member. These paddles and/or pins and/or brushes on the internal roller prevent clumps of fibers from forming and moving out of the box, while the external roller helps to separate the fibers and to doff them out of the inclined conveyor, so that they can fall into a weigh pan that is positioned underneath. The buffer box preferably sends a predetermined quantity of fibers to the weigh pan. This predetermined quantity can be controlled by one or more load cells and a computer. The weigh pan is generally a box shaped member with an open area for receiving fiber. When the weigh pan is filled to a predetermined quantity, the bottom of the pan opens dropping the quantity of fibers into a shaker box.

The shaker box is preferably an enclosure with one or more walls and with portions thereof that have a mesh for holding the fibers, and one or more doors for delivering the outgoing material. The mesh permits the long fibers of the backing to be retained in the box while the U material which is shorter will be released from shaker box because the U fibers can fit through the openings in the mesh. The box shakes the material therein for a set period of time. The shaker box preferably has an upper door that opens to receive the fibers. The U's are released from the shaker box preferably through another door, a bottom door, to allow them to drop onto a deflector plate.

The deflector plate preferably has two positions. When the deflector plate is in a first position, the shaker shakes and this permits the U fibers which are shorter to pass through the mesh of the shaker box, to then be directed by the deflector plate to a conveyor that moves them to the following steps of the process. The shaker box may shake the material therein for a set period of time, after which nearly all of the U's have passed through the opening in the mesh, and what remains in the shaker box is primarily the longer fibers which had made up the backing material of the carpet. The shaker box opens at the appropriate time and releases the long fibers. These long fibers fall onto the deflector plate, which is now in a second position. The fibers are sent by the deflector plate onto a second conveyor belt.

The first conveyor belt delivers the U fibers to a cleaning apparatus, preferably via a pneumatic conveying system, where the fibers receive further treatment. The second conveyor belt may also be a pneumatic conveying system which transports the larger backing fibers to a fiber press where the fibers are compacted and shipped for further treatment. The fibers sent to the fiber press are substantially comprised of only the backing fibers, with very little of the U fiber material being present therein. The quantity of U fiber material therein depends upon the length of the shaking time that was utilized.

The first conveyor belt transports the U's to a cleaning system that includes a second condenser. This second condenser may preferably be similar to the first condenser and have a cylindrical member that rotates. There is also a conveyor belt and a dividing plate, or other means that removes the fibers from the condenser. The cylindrical member may have a plurality of orifices and a negative internal pressure which causes the U's to be sucked up from the first conveyor. The U's are released from the outer surface of the cylinder where they fall toward a star valve. The star valve prevents dust from being released from the system. The star valve also controls the quantity of fibers that passes to a hammer mill. The hammer mill breaks up any adhesive or other coating material on the U's. From the hammer mill the U's are dropped onto a shaking table which has/may have a conveyor belt. The conveyor belt is preferably a wire mesh, or perforated metal sheet or plate. The shaker table causes the adhesive material or other coating that had been on the U's to be separated therefrom. The adhesive material drops from the shaker table to a collecting system that collects the adhesive powder and other debris. At the delivery end of the shaker table, a pneumatic conveyor transports the U fibers to a fiber press or to a storage box where it may await further processing. The material at the delivery end of the shaker table is substantially only U fiber material, with a very little contamination from backing fibers or adhesive material. The shaker table can also be just the conveyor with a mesh surface. The mesh surface causes adhesive debris to pass through while carrying the U fibers to, for example, the fiber press.

DETAILED DESCRIPTION OF THE INVENTION

Figure 1:
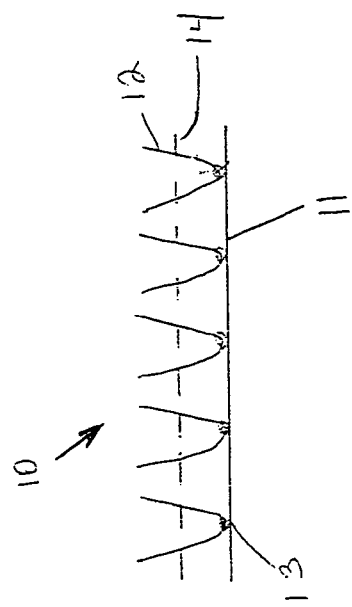
FIG. 1 shows a representative view of a carpet section taken from the side.

FIG. 1 shows a representative side view of a carpet section showing the individual components that make up a piece of carpet. The section 10 has a backing 11 to which the carpet fibers 12 or pile are secured at 13 by adhesive or other suitable means to the backing. The fibers that comprise the pile of the carpet extend outwardly from the backing and can be any desired length. The fiber may be sheared for example, in the area as referenced by the dotted line 14 or the carpet may be unsheared. When the carpet is unsheared the U's will be relatively longer U's. If the fiber is sheared then the fibers will be shorter U's. Both types can be used in the application.

The fiber of the carpet may be any suitable carpet material. Preferably, the fiber may be any typical thermoplastic materials used as the pile of a carpet including but not limited to nylon, polyester, wool, polyolefin, polyvinyl chloride etc. The nylon can be nylon 6 or nylon 6.6 for example. The backing may be any suitable material including but not limited to polypropylene, polyvinylidene chloride etc. The fiber may be secured to the backing by any suitable adhesive including, but not limited, to calcium carbonate, latex, etc.

In a process of recycling carpet, a portion of the face fibers can if desired be initially separated from the backing material such as a polypropylene backing. The system for recycling carpet can include a separation machine where the face fibers are separated from the backing material. The face fibers once separated from the backing can be sent for further processing. These face fibers are usually substantially a single type of polymeric material and are usually readily recyclable due to their being primarily a single material.

In one example of such a carpet recycling process there is a piece of carpet having a backing and a plurality of fibers secured to the backing and extending outwardly therefrom. The fibers can be any suitable carpet material including but not limited to polypropylene, nylon 6, nylon 6.6, polyester, polyolefin etc. The fibers can be separated from the backing by any suitable means. In one type of separation process the face fibers are mechanically sheared from the backing. The fibers that are sheared off are separated from the backing and can be processed for recycling leaving the backing and the remainder of the fibers that were secured to the backing. The remainder of the face fibers on the backing are call the short U's. One such process for removing the fibers from the backing is disclosed in our co-pending U.S. application Ser. No. 11/634,551, filed Dec. 6, 2006, now issued as U.S. Pat. No. 8,110,131, the disclosures of which are incorporated herein by reference.

The backing with the remainder of the fibers can be subjected to further treatment. For example, in another process pieces of the carpet may be fed into a machine which mechanically separates the carpet strips into its fiber and backing components. In this process a strip of carpet is placed on a feeder mechanism where a main drum that has a plurality of pins tear apart the carpet and free the face pile fibers from the backing structure. The remaining backing material has primarily backing material and adhesive or latex coating and only a minimal amount of face fibers or U's. This process is shown in more detail in our co-pending U.S. patent application Ser. No. 12/806,454 filed Aug. 12, 2010, now issued as U.S. Pat. No. 8,360,348, the disclosures of which are incorporated herein by reference.

The present invention is directed to a method and system for processing and separating carpet U material from the backing fibers and separating the backing fibers from the adhesive that secures the face fibers to the backing. The U's are U-shaped lengths of carpet fiber that may have carpet backing or adhesive material present. In the present invention, the U's are separated from the backing material. The fibers that make up the U's are treated so that adhesive or other material that secures the U's to the backing is broken up. The fibers of the backing are separated from the U's and can be further processed. At the end of the process of the present invention the fiber of the backing has been separated from the fibers that make up the U's and each material can be recycled.

Figure 3:
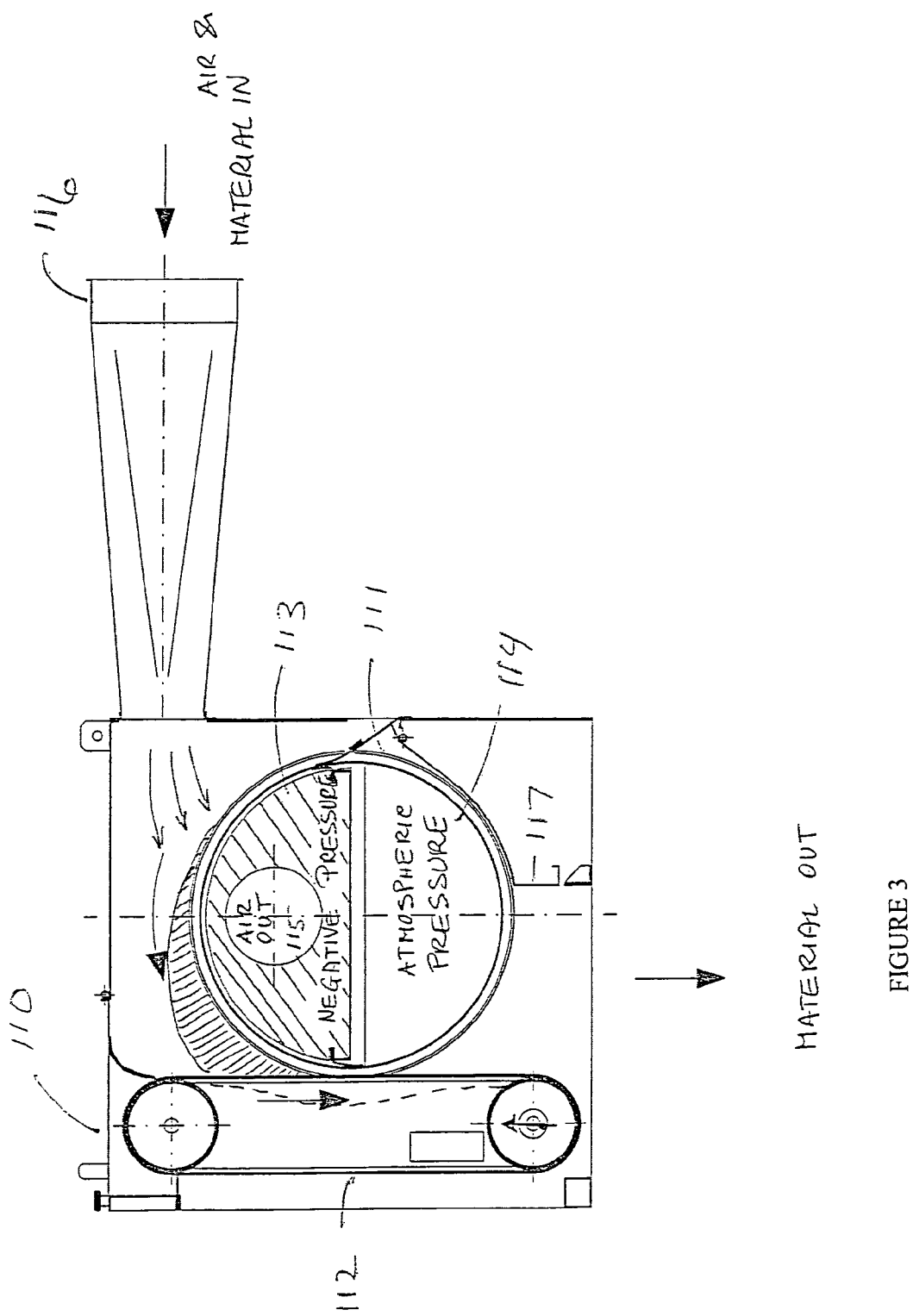
FIG. 3 is an enlarged view of the condenser cage of the shredding device of FIG. 2.

After the U's and backing materials have been broken up, for example, by a device such as the one that is the subject of U.S. patent application Ser. No. 12/806,454, issued as U.S. Pat. No. 8,360,348, the carpet material containing the U's is passed through a duct transition 116 to a condenser cage 110. The condenser cage is shown in more detail in FIG. 3. The condenser cage 110 preferably includes a cylindrical member 111, such as a drum, that rotates around a central axis and is divided by a horizontal plate into two sections—a top section and a bottom section. The top section 113 has a negative pressure. The bottom section 114 is at atmospheric pressure. The cylinder preferably has a series of orifices in the surface of the cylinder. As noted, there is an internal vacuum within the top section of the cylinder. The vacuum causes dust and other small particles to be removed from the carpet fibers and pass through the orifices in the surface of the drum. The dust and debris can pass through the air outlet 115. The larger fibers remain on the outer surface of the cylinder. The fibers are transported by the rotation of the condenser to a conveyor belt 112. When the fibers reach the conveyor, the rotation of the belt causes the U's to be moved to the bottom section at atmospheric pressure and released from belt 112. They drop from the condenser cage onto the conveyor belt 122 of the buffer box 120. Alternatively, there may be a blade or other scraping means 117 adjacent the drum that may also remove the fibers from the surface of the cylinder to thereby release the fibers from the vacuum and pass them onto the conveyor belt 122. In one embodiment, only the outer surface of the drum 111 rotates. Inside the drum, which does not rotate, is the top section 113 that has the negative pressure to cause dust and debris to be pulled through orifices in the drum. The fibers are held on the drum by the negative pressure. When the fibers on the outer surface of the drum reach the area where the pressure inside the drum is at atmospheric pressure due to the rotation of the drum, the fibers are released. In still another embodiment the conveyor belt 112 touches the perforated drum of the condenser while rotating at about the same peripheral speed in order to seal and keep separated the area of the condenser under negative pressure (i.e. the top section) from the one at atmospheric pressure (i.e. the bottom section) so that the air used for transporting the fibers is removed from the top part and delivered to filters. Once transported by the conveyor to be below the horizontal plate, the fibers are no longer subjected to negative air pressure, and may then fall into the buffer box.

Figure 4:
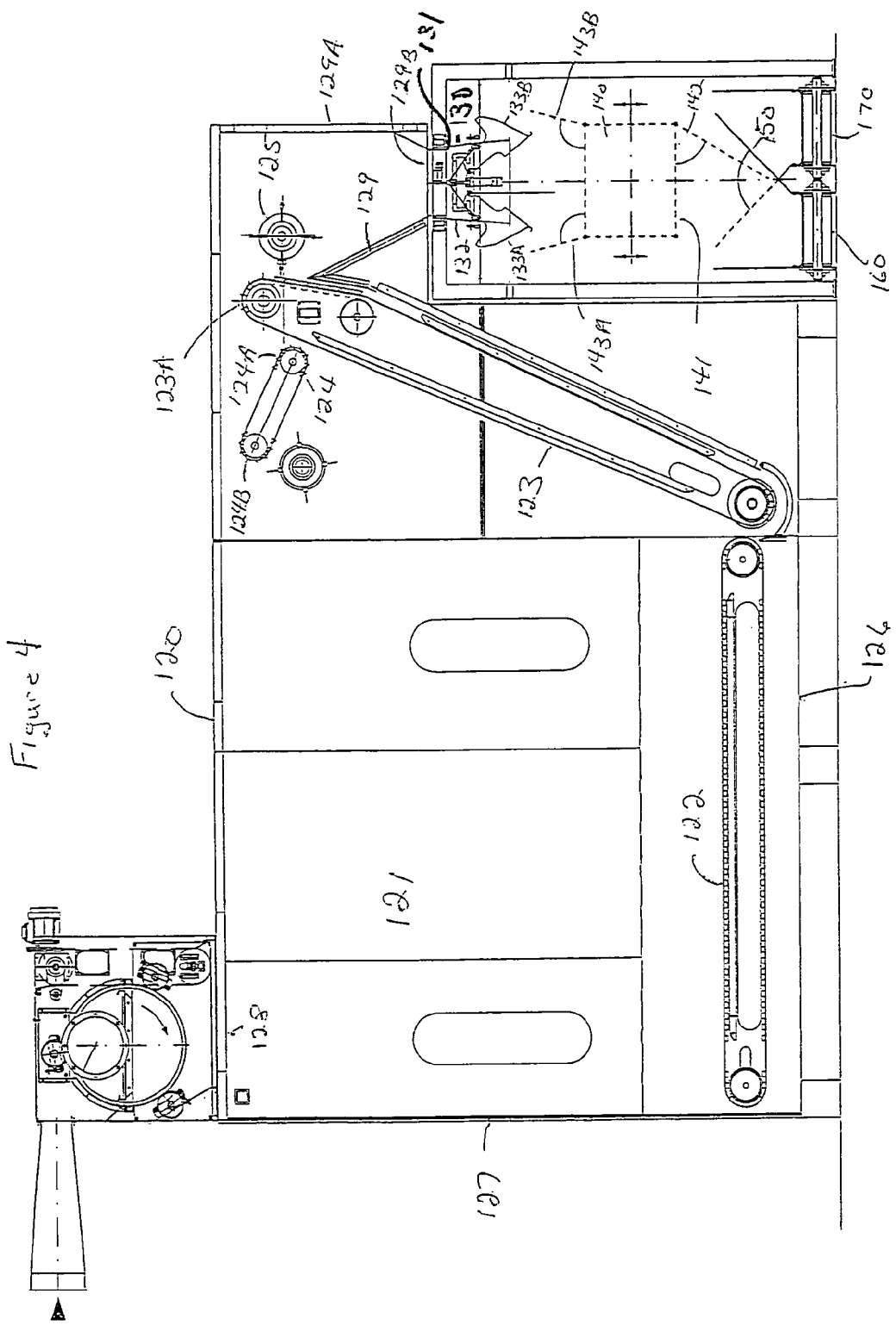
FIG. 4 is a side view of an example of the buffer box used with the present invention.

After separating the fibers from dust and debris in the condenser cage 110, the fibers are transported by the conveyor belt to a buffer box 120. See FIG. 4. The buffer box 120 includes a receptacle 121 which receives the fibers through an opening in the upper surface as the fibers are dropped from the condenser. The purpose of the buffer box 120 is for spacing of the delivery of the fibers to the weigh pan 130. The buffer box permits the delivery of the fibers to be more uniform and prevent clumping, as it can start and stop the delivery of fibers to the weigh pan when requested by the system.

Figure 5:
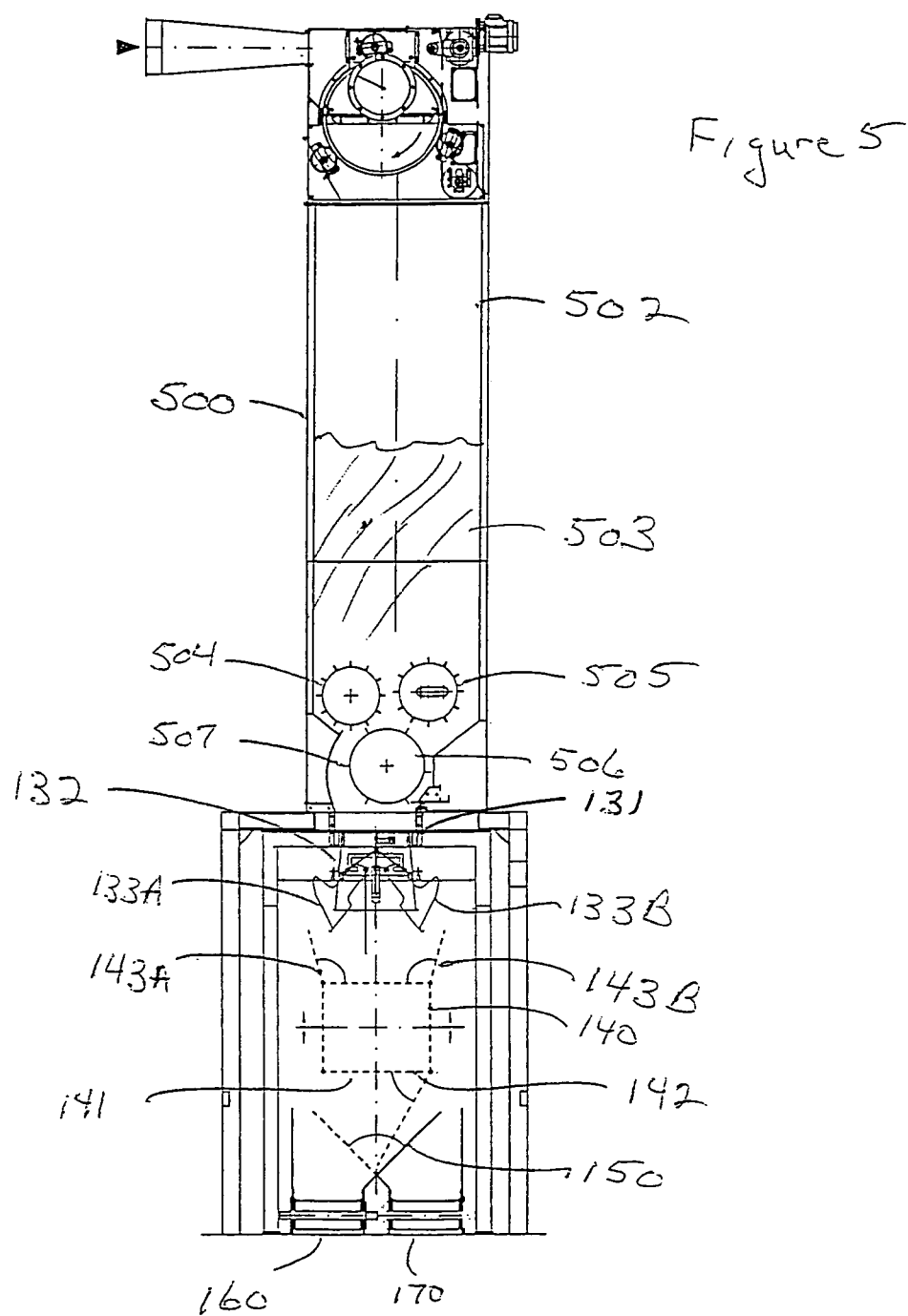
FIG. 5 is a side view of an example of a buffer silo which can be used instead of a buffer box.

Instead of a buffer box, a buffer silo can be used as seen in FIG. 5. The vertical buffer silo can be used where the floor space is at a premium and there is adequate height in the facility for the silo. The silo 500 shown in FIG. 5 is depicted as having the condenser cage 110 of FIG. 3 on the top or upper surface of the silo. Fiber 503 drops from the condenser cage 110 into the body of the silo 502. Towards the bottom of the silo body there are a pair of delivery rollers 504 and 505 that pass the fibers 503 to a doffing roller 506. The doffing roller 506 has a plurality of pins 507 extending outwardly of the outer surface of the roller. The pins separate and reopen the fibers that have become compressed during their stay in the silo and throw them in a controlled manner into the weighpan 130 positioned underneath the silo. When the weigh pan 130 contains a pre-set amount of fiber material, the two delivery rolls 504 and 505 of the silo stop. Equally, when a buffer box is used, the spiked conveyor belt 123 stops and the fiber material in the buffer box temporarily accumulate inside the receptacle 121 as it does in the receptacle 502 in the silo. The fibers fall onto a fiber hopper feed which may include a first horizontal conveyor belt 122 and a second inclined conveyor belt—the spiked conveyor belt 123. Alternatively there can be a single angled conveyor belt. In the buffer box the angled conveyor belt preferably have inclined spikes thereon. The conveyor belt can have different slopes. The higher the angle of inclination the lower the delivery capacity becomes and vice-versa. The delivery rate can also be changed by adjusting the speed of the belt.

If there is a single conveyor belt (the angled one), a smaller buffer volume and holding capacity may be used as well. The horizontal conveyor increases the capacity of the buffer box. The fibers drop onto the first conveyor belt 122 from the condenser cage 110. The first conveyor belt 122 receives the fibers and carries them along in a generally horizontal direction. At the end of the first conveyor belt 122, the fibers are passed to the second conveyor belt—the "spiked" conveyor belt 123, which transports the fibers upwardly by a series of pins or paddles protruding out of the belt. Near the top end of the spiked conveyor belt 123 there is a pair of rollers 124 and 125. The roller 124 is preferably equipped with four or more paddles or pinned bars or brushes 124A on the outer surface, and rotates in the same direction as the roller 123A that drives the spiked conveyor belt 123, thus rejecting the excess fibers resting upon the conveyor belt and sending them back into the receptacle portion of the buffer box. The roller 125 is a similar to roller 124, but rotates in the opposite direction as the conveyor belt roller 123A, and preferably rotates at a higher speed, so that its paddles or pinned bars or brushes will doff the fibers off from the conveyor belt onto a funnel transition 129, and drop them down into the weigh pan. The roller 124 can be a single roller that is driven itself, or it can work in conjunction with a doffing belt 124A that rotates about roller 124B, and may have a plurality of pins extending therefrom instead of the pins extending from the surface of the stand-alone roller.

In a preferred embodiment, the buffer box has a base 126 and one or more sides 127. The buffer box has an open area 128 for receiving fibers from the condenser cage 110. There is also a funnel transition 129, which directs the fibers to the weigh pan 130. This funnel transition 129 works in conjunction with at least one side wall 129A and forms an open area 129B which passes the fibers to the weigh pan. The funnel transition is open to the body area of the buffer box and the funnel transition extends downwardly so that the fibers can be readily passed to the weigh pan 130. The second conveyor—"spiked" conveyor belt 123—preferably includes a plurality of inclined steel pins distributed across the surface of the conveyor belt. The pins can be in various patterns. In an alternative embodiment the second conveyor belt may have a paddle wheel type conveyor belt which has a plurality of spaced apart steps or paddles on its outer surface which raise the fibers. The paddles may, for example, be in the form of a flat member that is generally rectangular or square and having a base in contact with the outer surface of the belt, a pair of sides generally along the edges of the conveyor belt and a top surface. If desired, the flat member may have a pair of side walls extending from the sides of the flat member that help retain the fibers on the conveyor belt 123 as the fibers rise to the end of the belt. It will be appreciated by those skilled in the art that other means may be included on the belt to retain the fibers in position as the conveyor travels upwardly.

In one embodiment, one or both of the rollers 124 and 125 may be equipped with four paddle plates. The roller 124 rotates with the plates going in the opposite direction of the motion of the pins of the conveyor, while the paddles of the roller 125 rotate with the plates going in the same direction as the motion of the pins on the conveyor, and the rotation of the roller 125 can be at a higher speed than the conveyor. The roller 124 returns to the buffer box any excess fiber that would build up above the surface of the pins. The roller pulls the material out of the pins with the help of air flow generated by its high speed rotation.

In an alternate embodiment, the rollers 124 and 125 may be provided with a plurality of needles or pins which extend outwardly of the surface of the roller. These pins prevent further shred or breaks up the fibers and the adhesive that may be on them as the second conveyor carries the fibers upward. The pins further prevent clumping of the fibers at the end of the conveyor belt 123. These pins pull at the fibers as they reach the top of travel on the conveyor belt and force the fibers out through the exit at a generally uniform pace so that the exit does not become clogged and the fibers do not agglomerate in a mass. The fibers are dropped from the exit opening 129B of the buffer box 120 into the weigh pan 130.

The weigh pan 130 helps control the amount or quantity of fibers that are processed in any given cycle. In a one embodiment, the weigh pan 130 can be in the form of a rectangular container of generally the same width of the buffer box 120, positioned under the delivery opening of the buffer box 120 to collect the fibers removed by the roller 125 out of the pins of the "spiked" conveyor belt 123. The weigh pan may be installed on electronic load cells that stop the feeding of fibers from the buffer box when a set quantity of fibers is reached in the pan. Then, two air cylinders open the bottom hinged flaps of the pan 133A and 133B and the fibers fall into the separation chamber, which may be shaker box 140 where the fibers are shaken. The shaker box is made of a box having similar dimensions as the weigh pan, but with all the walls made of metal wire netting with holes of appropriate dimensions to let only the U's fall out but not the longer threads of the backing. The shaking box is equipped with top and bottom opening walls, preferably operated by air cylinders, that alternatively open and close according to the programmed working cycle (the weigh pan drops the fibers into the shaking box, its top closes, the fibers are shaken for a set time, during this time the U's coming out of the grill of the shaking box fall on the apron 170, then the plate 150 turns to the right position, the bottom wall opens and drops the remaining long backing fibers onto apron 160 and then to bale press or other additional treatments (further opening or cleaning or direct feed to a nonwoven line). Then the cycle starts again (new fiber from the weigh pan into the shaking device, etc.)

Figure 2:
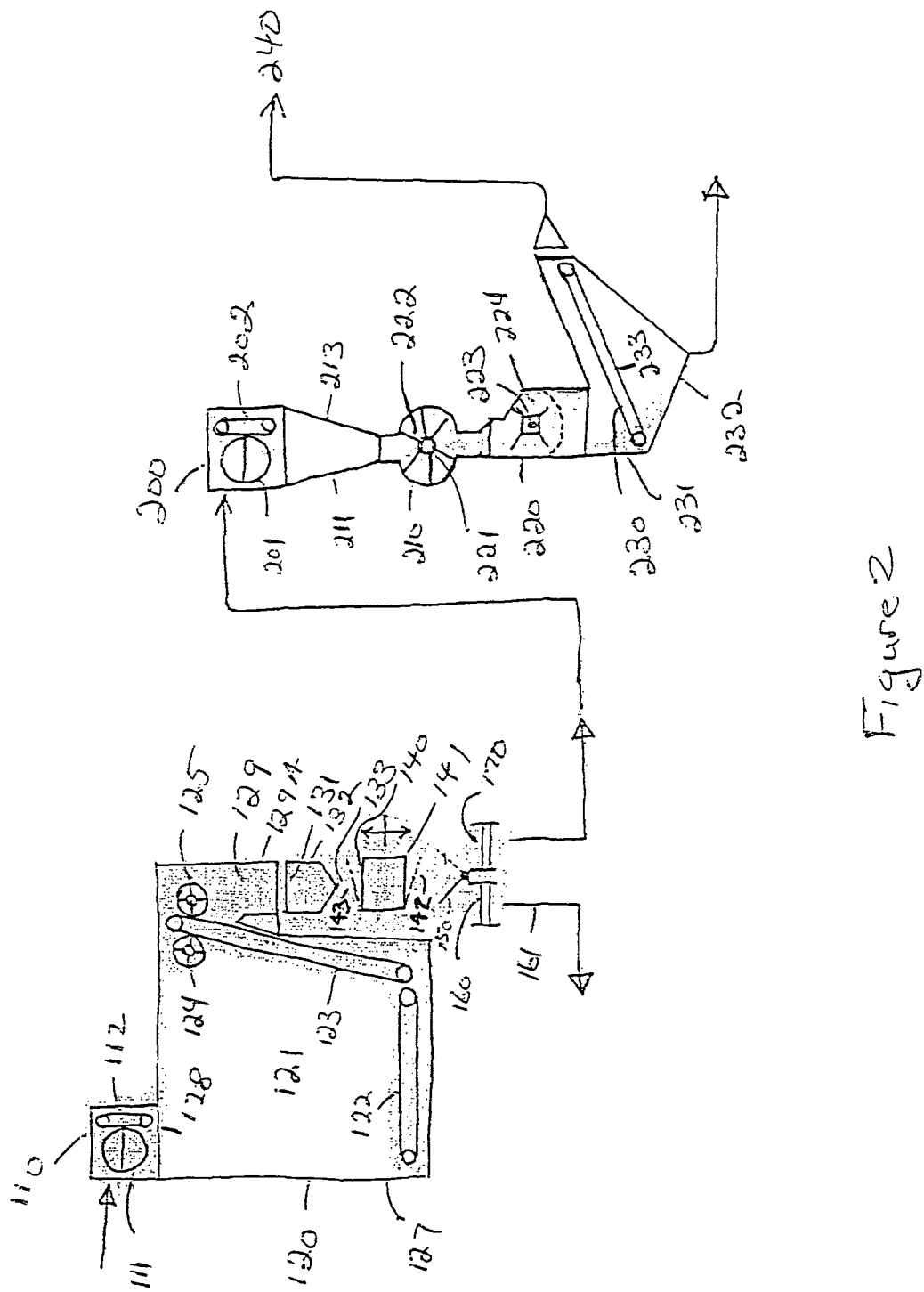
FIG. 2 is a schematic view of an example of a carpet shredding device of the present invention.

In another example, the weigh pan 130 has an open end 131 and one or more sidewalls 132. The sidewalls 132 may extend from the open end 131 to the discharge area 133. The discharge area 133 preferably comprises two plates hinged on the sides of the weigh pan body to hold the fibers therein until a set weight is reached, and then the two plates pivot to allow the fibers to enter the shaker box 140, where the fibers are shaken. The walls of the shaker box 140 are preferably formed of a metal wire mesh, with the openings therein having a dimension selected according to the size of the fibers. The entire walls may be a wire mesh or only portions thereof may be. The shaker box 140 shakes and vibrates. The separation chamber can have any form, rectangular, cylindrical etc. In one embodiment, the shaker box can move in an up and down direction, or in a side to side direction, or front to back, or any combination of such vibratory motion. In addition, the shaker box can rotate about an axis. The long fibers that are the backing remain inside the shaker chamber and the shorter fibers that are the U's fall out of the box through the orifices in the walls of the box. The size of the orifices can vary as desired depending on the lengths of the U fibers that we are processing. The orifices can be in a screen wall that can be replaced or substituted on the shaker box as needed. The shaker box has a top side that has an opening which may be in the form of a door 143A and 143B, in FIG. 4 (door 143 in FIG. 2), to permit the fibers from the discharge area 133 of weigh pan 130 to enter the shaker box. The door may be operated automatically and may be driven by mechanical means, electronic means, hydraulic means, pneumatic means etc. In a preferred embodiment, there is a bottom opening 141 with a second door 142 that opens or is removable on the lower side of the shaker box. The openings may have a door that is hinged or sliding to provide access to the interior of the shaker box.

As the shaker box 140 vibrates and rotates, the smaller fibers that make up the U's are expelled from the shaker box 140 through the screening of the chamber to the plate deflector 150 which delivers the short fibers to the apron 170. Once the shaking is completed, the longer fibers that made up the backing remain in the shaker box 140, and are removed from the chamber by gravity after the door 142 is opened. The plate deflector 150 may be moved to its second position whereby the longer fibers are delivered to the left apron 160. The left apron 160 is preferably a conveyor belt that transports the longer fibers via a pneumatic conveying system 161 to the fiber press.

The shorter fibers that are delivered to the apron 170 are transported therefrom by a conveyor to the cleaning system for further processing. Portions of the U's may have adhesive or latex or other materials on the fibers that preferably need to be removed. The conveyor transports the fibers to a second condenser 200. The second condenser may be similar to the first condenser (see FIG. 3), or it may have a different arrangement. In the preferred embodiment, the condenser includes a rotating drum 201 that has a negative pressure in its interior top section and a plurality of orifices on its surface. The negative pressure inside the top part of the condenser drum sucks the fibers and holds them against the drum due to the vacuum. The drum also separates a large quantity of loose adhesive material or other debris from the fiber, because, as they are usually smaller than the fibers, they pass through the orifices into the interior of the drum. The layer fibers from the U's remain on the surface of the drum. The fibers on the drum can be removed by for example a blade or other means which separates the fibers from the outer surface of the drum.

In another embodiment the conveyor belt 202 touches the perforated drum of the condenser while rotating at about the same peripheral speed in order to seal and keep separated the area of the condenser under negative pressure (i.e. the top section) and the one at atmospheric pressure (i.e. the bottom section) so that the air used for transporting the fibers is removed from the top section and delivered to filters. When the fibers reach the conveyor belt and are moved so as to be below the separating plate of the drum, they are no longer subjected to the forces of the vacuum, and may thus fall into the star valve 210 through a conical transition which has a large opening at its top. This conical member directs the fibers to the star valve 210. The star valve is used to permit the fibers to pass from one region at a first air pressure to a second region at a second different pressure. The star valve is also used as a volumetric measuring device for metering product to the hammer mill 220. The purpose of the star valve is to seal the inlet of the hammer mill 220 in order to trap dust inside the hammer mill. The star valve 210 may be, for example, an indirect star valve or a direct star valve. The star valve usually has an opening on its upper region that receives the fibers. There are one or more rotors that rotate in the body of the star valve. The rotor can be driven by a chain and pinion system in an undercut star valve or by a direct motor drive.

In one embodiment, the star valve rotates at 221, so that at least one or more or preferably three flaps 222 may touch the internal side of the valve chamber to keep the top inlet of the valve at a different pressure than the bottom outlet.

Figure 6:
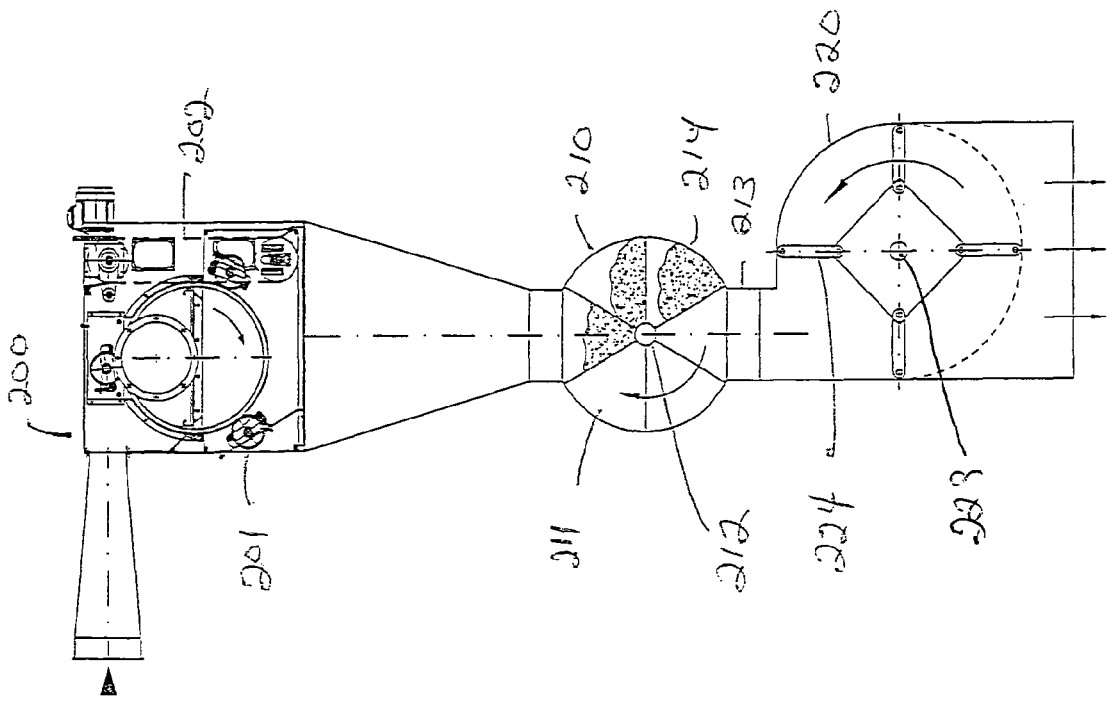
FIG. 6 is a side view of an example of the hammer mill that can be used in the present invention.

The star valve may have a plurality of chambers 211 that receive the fibers 214. The chambers rotate about an axis 212. As the chamber reaches the lower opening 213, the fibers pass to the hammer mill 220. The star valve prevents dust generated in the milling of the fibers from coming out of the machine. At the same time, the star valve provides a constant controlled feeding of fibers to the hammer mill 220. The star valve 210 passes the fibers to a hammer mill 220 which crushes the adhesive or latex covering that remains on the fibers, see FIG. 6. The hammer mill may preferably be a drum containing a vertical or horizontal rotating shaft 223 or drum on which a plurality of hammers 224 are mounted. The hammers may be free to swing on the ends of the cross or fixed to the central rotor. As the rotor spins the fibers are fed into the drum where the fibers are impacted by the hammers and the adhesive or other coating material on the fibers is crushed. This material is usually a calcium carbonate material but can vary depending on the make up of the carpet. In one embodiment, the hammer mill may include a transverse shaft bearing a series of hammers in the form of steel bars hinged to the body of the shaft.

In one embodiment, the hammer mill is composed of a shaft equipped with a series of square metal plates fixed at regular intervals from each other. At the corners of the plates, there are hardened steel bars (hammers) that are provided with pins between two following plates The hammers are free to rotate around the pins. The inertial force of the rotation of the shaft throws the hammers out radially, so that they hit the material fed into the machine and drag it around, hammering it and reducing its dimensions. In the bottom part of the hammer mill chamber there is a perforated steel plate with holes of proper design and size so that all the material under certain size passes through the holes of the grill and falls out of the machine. The hammers crush the fibers against a bottom grill. The grill may have different hole patterns, i.e. square, round, etc., and sizes.

Below the grill there is a collecting chute or a conveyor belt. For a more thorough cleaning of the hammer milled fibers, the conveyor belt can have a perforated mesh and a vibrating means that vibrates the belt. Alternatively, there can be a vibrating table with perforations in the surface of the table.

The fibers and adhesive dust and debris are transported to a shaker table 230. The shaker table is positioned in a receptacle 231 preferably open at an end. The fibers drop onto the table 230 where they are shaken by the motion of the table. The fibers because of their weight remain on the table while the particles of adhesive are shaken off of the table and drop onto a collecting system 232. The collecting system removes the dust of the adhesive from the shaker table. The shaker table can include a conveyor belt 233 which will transport the fibers to a machine 240 that can be a fiber press where the U fibers can be processed into a bale, or to a storage box where they can be fed automatically to a pelletizing device.

The present invention provides two groups of fibers from the carpet. The first are the fibers that make up the backing. The second group is the fibers that make up the U's. The present process provides a means such that the two groups of fibers are substantially only one type of fiber and do not have large amounts of the other type of fiber present. This permits the fibers so separated to be used in applications as would virgin fibers that had not heretofore been used in a carpet.

The invention claimed is:

1. A method of further processing carpet pile U's after being mechanically separated from carpet backing, for removing remaining backing fibers and adhesive from the mechanically separated pile U's, said method comprising; transporting a the mechanically separated pile U's to a weigh pan; weighing, using said weigh pan, of a predetermined amount of the mechanically separated pile U's; receiving the predetermined amount of pile U's through an upper opening of a shaker chamber, and enclosing said upper opening of said shaker chamber by closing an upper door upon said upper opening; shaking said shaker chamber for a set period of time for causing further separating therein of the remaining backing fibers from the predetermined amount of pile U's, and passing of the further separated pile U's through a plurality of selectively sized orifices in said shaker chamber, leaving a portion of the remaining backing fibers in said shaker chamber; feeding of the further separated pile U's into a hammer mill, and controlling said feeding using a valve; rotating hammers in said hammer mill for crushing adhesive remaining on the further separated pile U's; and passing the adhesive-free pile U's and the crushed adhesive to a cleaning means configured for separating the crushed adhesive material from the adhesive-free pile U's.

2. The method according to claim 1 further comprising storing the mechanically separated pile U's in a buffer box, and spacing of said transporting of the pile U's upon said weigh pan using one or more conveyor belts configured for transporting of the pile U's to said weigh pan from said buffer box.

3. The method according to claim 2 further comprising using, with said weigh pan, one or more electronic load cells configured for stopping said transporting of the pile U's by said one or more conveyor belts, when said predetermined amount of the separated pile U's is transported to said weigh pan.

4. The method according to claim 3 further comprising uniformly delivering of the pile U's from said one or more conveyor belts using one or more rollers for doffing of excess pile U's off of said one or more conveyor belts.

5. The method according to claim 4 wherein said receiving of said predetermined amount of the pile U's from said weigh pan into said shaker chamber comprises opening one or more hinged flaps on said weigh pan.

6. The method according to claim 1 further comprising opening a lower door covering a lower opening of said shaker chamber, and exiting of the remaining backing fibers in said shaker chamber out from said lower opening.

7. The method according to claim 6 automatically closing said upper and lower doors using air cylinders.

8. The method according to claim 6 further comprising moving a deflector plate to a second position, for directing the remaining backing fibers exiting said lower opening of said shaker chamber into a baler, and baling said backing fibers therein.

9. The method according to claim 6 further comprising forming said shaker chamber into a box comprising four side walls for creating said upper opening and said lower opening; and pivotally attaching said upper door to an upper portion of said four side walls, and pivotally attaching said lower door to a lower portion of said four side walls.

10. The method according to claim 9 wherein said plurality of selectively sized orifices comprise forming at least a portion of each of said four walls and at least a portion of said upper and lower doors of a wire mesh.

11. The method according to claim 9 wherein said shaking of said shaker chamber comprises one or more of:
moving said shaker chamber in an up and down direction;
moving said shaker chamber in a side to side direction;
moving said shaker chamber in a front to back direction; and
rotating said shaker chamber about an axis.

12. A method of further processing carpet pile U's after being mechanically separated from the carpet backing, for removing remaining backing fibers and adhesive from the mechanically separated pile U's, said method comprising:
delivering the mechanically separated pile U's upon a weigh pan;
weighing, using said weigh pan, of an incremental amount of the mechanically separated pile U's;
dropping the incremental amount of mechanically separated pile U's from said weigh pan through an upper opening of a shaker chamber, and covering said upper opening of said shaker chamber by closing an upper door upon said upper opening;
shaking said shaker chamber for a set time, for causing further separating therein of the remaining backing fibers from the incremental amount of pile U's;
expelling of the further separated pile U's from a plurality of selectively sized orifices in one or more surfaces of said shaker chamber, and retaining of a substantial portion of the remaining backing fibers in said shaker chamber, with said remaining backing fibers being retained in said shaker chamber by being larger than said selectively sized orifices;
directing the further separated pile U's exiting said shaker chamber, using a deflector plate in a first position, to a transport means;
transporting the further separated pile U's to a condenser, using said transport means, and removing of dislodged adhesive therein;
receiving the condensed pile U's from said condenser, through a transition, into a valve;
providing a controlled feeding of the condensed pile U's to a hammer mill using said valve;
rotating hammers in said hammermill to crush adhesive remaining on the condensed pile U's;
separating crushed adhesive from the condensed pile U's using a grill.

13. The method according to claim 12, further comprising:
receiving the condensed pile U's from said grill onto a first end of a conveyor belt of a shaker table; and shaking said table for further removing of particles of adhesive from the pile U's through perforations in said conveyor belt.

14. The method according to claim 13, further comprising pressing the processed pile U's into bales using a press.

15. The method according to claim 13, further comprising pelletizing the processed pile U's into pellets, using a pelletizer.

16. The method according to claim 13, further comprising storing the mechanically separated pile U's in a buffer box, and spacing of said delivery of pile U's upon said weigh pan using one or more conveyor belts configured for delivering of the pile U's to said weigh pan from said buffer box.

17. The method according to claim 16, further comprising using, with said weigh pan, one or more electronic load cells configured for stopping said delivering of pile U's by said one or more conveyor belts to said weigh pan, when said incremental amount of the separated pile U's is delivered thereto.

18. The method according to claim 17, further comprising uniformly delivering of the pile U's from said one or more conveyor belts using one or more rollers for doffing of excess pile U's off of said one or more conveyor belts.

19. The method according to claim 18, wherein said dropping of said incremental amount of the pile U's from said weigh pan comprises opening one or more hinged flaps on said weigh pan.

20. The method according to claim 12, further comprising opening a bottom door covering a lower opening of said shaker chamber, and exiting of the remaining backing fibers in said shaker chamber out from said lower opening.

21. The method according to claim 20, further comprising automatically closing said upper and lower doors using air cylinders.

22. The method according to claim 20, further comprising moving said deflector plate to a second position, for directing the remaining backing fibers exiting said lower opening of said shaker chamber into a baler, and baling said backing fibers therein.

23. The method according to claim 20, further comprising forming said shaker chamber into a box comprising four side walls for creating said upper opening and said lower opening; and pivotally attaching said upper door to an upper portion of said four side walls, and pivotally attaching said lower door to a lower portion of said four side walls.

24. The method according to claim 23, wherein said plurality of selectively sized orifices comprise forming at least a portion of each of said four walls and at least a portion of said upper and lower doors of a wire mesh.

25. The method according to claim 23, wherein said shaking of said shaker chamber comprises one or more of:
moving said shaker chamber in an up and down direction;
moving said shaker chamber in a side to side direction;
moving said shaker chamber in a front to back direction; and
rotating said shaker chamber about an axis.

26. A method of further processing carpet pile U's after being mechanically separated from carpet backing, for removing remaining backing fibers and adhesive from the mechanically separated pile U's, said method comprising:
transporting the mechanically separated pile U's to a weigh pan;
weighing, using said weigh pan, of a predetermined amount of the mechanically separated pile U's;
receiving the predetermined amount of pile U's through an upper opening of a shaker chamber, and enclosing said upper opening of said shaker chamber by closing a door upon said upper opening
shaking said shaker chamber for a set period of time for causing further separating therein of the remaining backing fibers from the predetermined amount of pile U's, and passing of the further separated pile U's through a plurality of selectively sized orifices in said shaker chamber, leaving a portion of the remaining backing fibers in said shaker chamber; and
passing the further separated pile U's to a cleaning means configured for removing loose adhesive therefrom.

\* \* \* \* \*